UNITED STATES PATENT OFFICE.

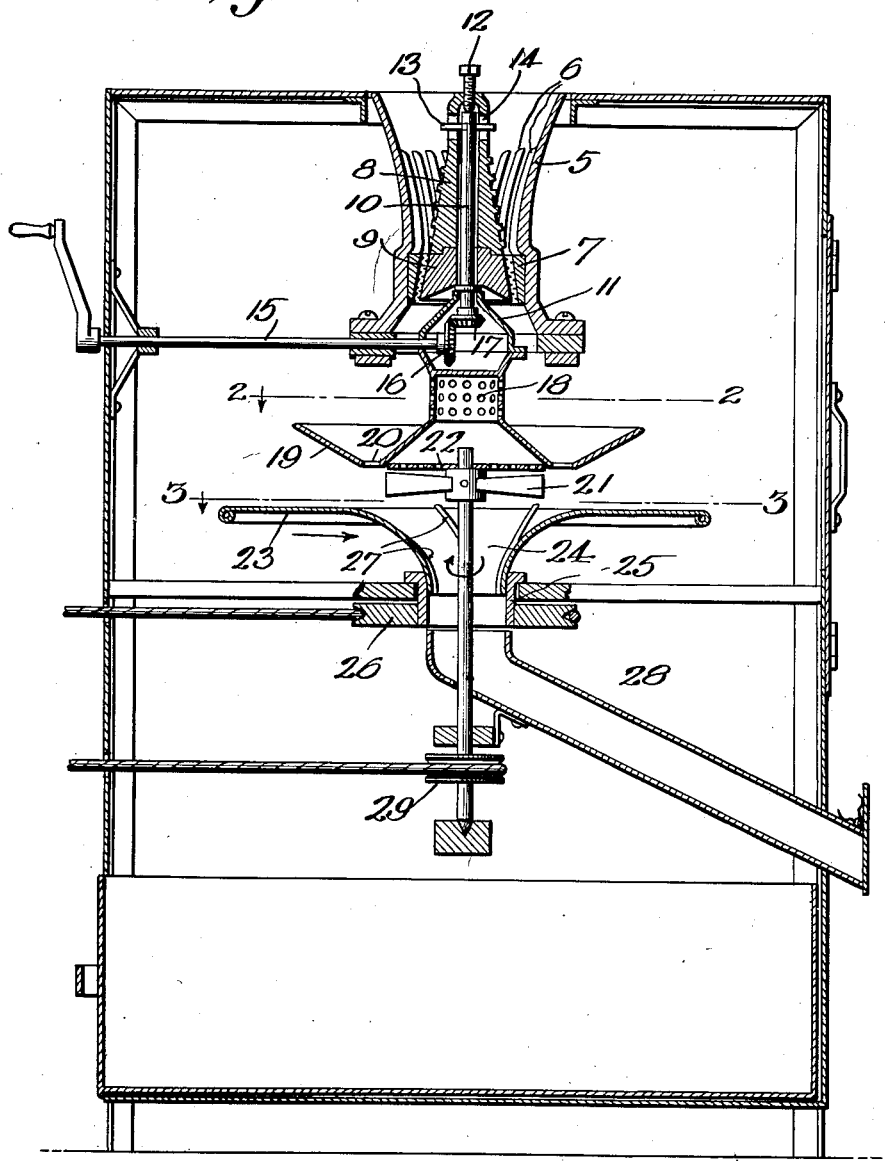

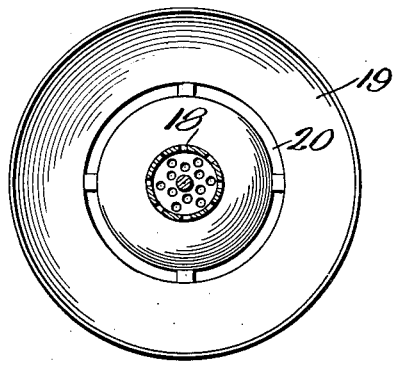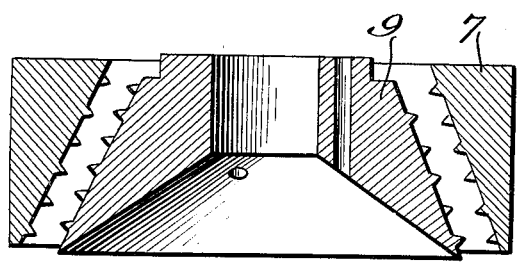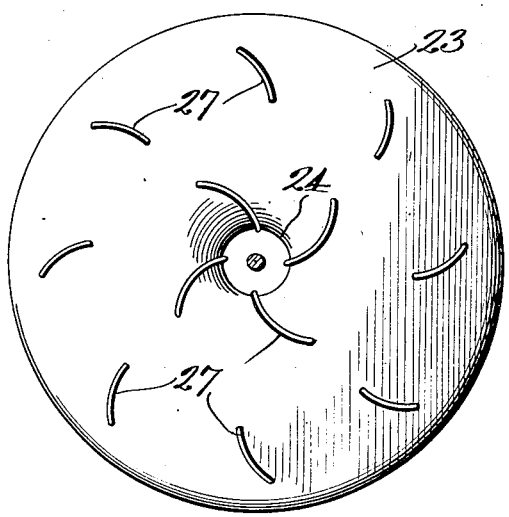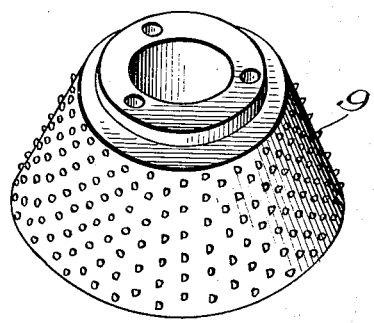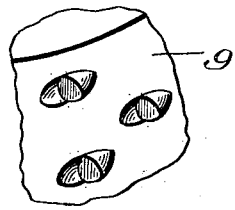

FANNIE S. SPITZ, OF ALBUQUERQUE, NEW MEXICO.

NUT SHELLING AND SEPARATING MACHINE.

1,266,075.                     Specification of Letters Patent.     Patented May 14, 1918.

Application filed August 21, 1917. Serial No. 187,377.

*To all whom it may concern:*

Be it known that I, FANNIE S. SPITZ, a citizen of the United States of America, and a resident of Albuquerque, county of Bernalillo, State of New Mexico, have invented certain new and useful Improvements in Nut Shelling and Separating Machines, of which the following is a full and clear specification.

This invention has relation to machines for shelling or hulling nuts, and it consists of certain novel features of construction hereinafter described and claimed.

In the drawing—

Figure 1 is a vertical sectional view of a machine embodying the preferred form of my invention;

Fig. 2 is a horizontal section on the line 2—2 of Fig. 1 looking downwardly;

Fig. 3 is a similar section on the line 3—3 of Fig. 1 looking downwardly;

Figs. 4 and 5 detail views of the cracking and shelling members; and

Fig. 6 is a perspective detail of part of the cone.

The cracking and shelling mechanism proper consists of a cone hopper or shell 5 which is provided in its interior with suitable ribs 6 at its upper part and an annular cracking surface 7 within its lower or discharge end. In this shell is mounted an upright cone 8 provided with a suitable spiral rib or ribs on the exterior of its upper portion, which rib or ribs coöperate with the ribs 6 to feed the nuts downwardly to the shelling devices, which consist of the aforesaid annular member 7 and a similar annular member 9 affixed to the surface of the cone at its base, in position to coöperate with the shelling member 7. There is an annular space between the members 7 and 9, and the operative faces of these members have sharp rasp-like projections on them, so that, as the cone rotates, the shells of the nuts will be cracked and torn loose from the meats, and the shells, meats and chaff will automatically feed downwardly and drop out from between the shelling members.

The cone is mounted upon a central shaft 10 which is stepped in the central housing 11, the cone being vertically adjusted on the shaft by means of a set screw 12 passing down through the top end of the cone and bearing upon the top end of shaft 10, to thereby permit vertical adjustment of the cone to accommodate nuts of different sizes, the cone being prevented from rotating on the shaft by means of a pin 13 affixed to the shaft and extending through longitudinal slots 14 formed in the cone.

A horizontal driving shaft 15 extends laterally into the housing 11 and is provided with bevel-gear 16 which meshes with a similar gear 17 attached to the lower end of shaft 10, whereby the cone may be rotated. The housing 11 incloses the gears 16 and 17 and prevents the accumulation of foreign matters thereon. Depending from the housing is an annular, perforated air-inlet tube 18, and depending from the lower end of this tube 18 is an annular trough 19 having an annular discharge opening 20 which is arranged concentric with the discharge of the shelling members, so that the shells, chaff and meats drop directly into the annular trough 19 from the shelling mechanism.

A horizontal fan 21 is arranged centrally under the trough 19 so as to pull the air down through the perforated tube 18 and throw it out annularly directly under the annular discharge slot 20 of the trough. The top surface of the housing 11 inclines downwardly, so as to insure the complete discharge of the materials as they issue from the shelling members, and the sides of the trough 19 incline downwardly toward the discharge opening 20, so as to insure continuous discharge of the shells, chaff and meats to the annular opening 20.

Above the fan 21 is arranged a perforated plate 22 which serves to insure a comparatively equal distribution of the air to the fan, to thereby insure a substantially uniform blast of air entirely around the discharge opening 20.

Centrally below the fan is arranged a rotatable disk 23 which is considerably larger in diameter than the annular trough 19 and is provided with a central downwardly-tapering discharge tube 24. The lower end of this tube 24 is open and is affixed to the tubular shaft 25 journaled in a part of the frame of the machine and is provided with a driving pulley 26 whereby disk 23 may be rapidly rotated during the operation of the machine. The fan and the disk will rotate in opposite directions, as indicated by the arrows in Fig. 1, the action of the fan being to blow the chaff and shells outwardly beyond the edge of the disk 23, whence they fall into a suitable receptacle below, and the meats of the nuts, being heavier than the shells and the chaff, drop through the blast and are deposited upon the disk. The disk is provided with tangential, slightly-curved ribs 27 which serve to gather the meats and direct them into the central discharge tube 24. The meats drop through the hollow bearing sleeve 25 and into a discharge spout 28. The shaft of the fan depends through the tube 24, sleeve 25, and the upper end of spout 28, and at its lower end is provided with a driving pulley 29.

It will be observed that by providing the operative annular inclined surfaces of the hulling members with a multiplicity of sharp, rasp-like projections, which projections are staggered on the operative surfaces of the hulling members, the nuts, as they pass down between these members, are caught between the sharp projections and have their hulls first cracked and then torn loose from the meats. The action is that of a shredder, as distinguished from a crushing or cracking action, the hulls of the nuts in question being too tough and flexible to be effectually removed from the meats by merely cracking the shells.

Where there is but one of my machines in a plant, the nuts will, of course, be first graded as to size, and the cone is adjusted separately for each batch of nuts. This, of course, will not be necessary in a plant where a sufficient number of machines is provided to take care of the several grades of nuts, thus avoiding the necessity of adjusting the cones for the various batches. Even this adjustment of the cone for the various sizes of nuts may be largely eliminated by the employment of the resilient means for normally centering the conical member covered by my former Patent No. 1,211,978, dated January 9, 1917. In adjusting the shelling members 7 and 9 with respect to each other, the parts are so positioned that space is left for the passage of the nuts without their being materially torn by the sharp projections. The staggered teeth, rotating in opposite directions, bite into the hulls and crack and rip the hulls away from the meats. The oppositely-inclined faces of the hulling members are parallel in all their adjustments and they incline beyond the angle of repose, so that the shells and chaff and meats gravitate during the hulling action.

The nature and scope of the invention having been thus indicated and its preferred embodiment having been specifically described, what is claimed as new is:

1. In a nut-shelling machine, the combination of means for removing the shells from the meats, said means being provided with a circular discharge opening at its lower end, superimposed over an annular trough for receiving the shells and the meats and provided with an annular discharge outlet, and means below the trough for separating the shells and chaff from the meats by a radial blast.

2. The structure recited in claim 1, a horizontal rotating disk being provided below the blast, this disk being provided with a central discharge opening for the meats.

3. In a nut-shelling machine, the combination of means for removing the shells from the meats provided with an annular discharge outlet superimposed over an annular trough for receiving the shells and the meats and provided with an annular discharge outlet, and means below the trough for separating the shells and chaff from the meats by a radial blast, a horizontal rotating disk being provided below the blast, this disk being provided with a central discharge opening for the meats, the central discharge opening tapering downwardly and provided with ribs inclining in the direction of rotation of the disk to insure the directing of the meats into the central discharge opening.

4. In a nut-shelling machine, the combination with means for removing the shells from the nuts and discharging them through a circular opening at the lower end thereof, of an annular trough having inclined sides inclining toward an annular discharge opening, this trough being constructed so as to permit air to pass centrally down through it, a rotary fan arranged below the trough adapted to draw air down through the center of the trough and force it outwardly across the discharge opening of the trough, and means below for completing the separation of the nuts from the shells and chaff.

5. In a nut-shelling machine, the combination with means for removing the shells from the nuts provided with an annular discharge opening, said opening being arranged above and in vertical alinement with an annular trough having inclined sides inclining toward an annular discharge opening, this trough being constructed so as to permit air to pass centrally down through it, a rotary fan arranged below the trough adapted to draw air down through the center of the trough and force it outwardly across the discharge opening of the trough, and means below for completing the separation of the nuts from the shells and chaff, said means consisting of a horizontal rotatable disk provided with a downwardly-tapered central discharge opening.

6. In a nut-shelling machine, means for removing the shells from the meats, said means being provided with an annular discharge opening at its lower end, an annular trough for receiving the shells and meats arranged below said discharge opening and being provided with an annular outlet, the discharge opening of said shelling means being directly above said annular trough to cause said shells and meats to discharge from said shelling means by gravity, a horizontal rotating disk below said trough provided with a central discharge opening and means positioned between said trough and disk for separating the shells and chaff from the meats by a radial blast.

7. In a machine of the character described, the combination with shelling means provided with an annular discharge opening at its lower end, of a centering member, the annular discharge of the shelling means being arranged above said centering member and in vertical alinement therewith so that the shells and meats discharge from the shelling means by gravity, a separating disk mounted below said centering member, and means positioned between said centering member and separating disk to separate the shells and chaff from the meats.

8. In a machine of the character described, the combination with shelling means provided with an annular discharge opening at its lower end, of a centering member comprising an annular trough provided with a circular discharge opening, said centering member being arranged directly below said shelling means so as to receive the discharge of the shelling means, a separating disk revolvably mounted below said centering member and provided with a central discharge opening, and means positioned between said centering member and separating disk to separate the shells and chaff from the meats by a radial blast.

9. In a machine of the character described, the combination with shelling means provided with an annular discharge opening at its lower end, of a centering member arranged beneath said discharge opening and in alinement therewith so as to receive the discharged shells and meats from the shelling means by gravity, said centering member comprising an annular trough provided with an annular discharge opening, a separating disk mounted below said centering member and provided with a central discharge opening, the discharge opening of the centering trough being positioned so as to drop the contents of the trough at a point intermediate the discharge opening and the outer periphery of the separating disk, and means for directing a radial blast against the contents of the trough as it drops upon the separating disk.

10. A separating machine having a feed-hopper provided with an annular discharge opening, a separating disk mounted below said hopper and provided with a central discharge opening, centering ribs upon said disk to direct the contents of said disk toward the discharge opening, means below the hopper for directing a radial blast against the material dropping upon the separating disk, and means for conveying away the material discharged through the discharge opening of said separating disk.

11. A separating machine having a feed-hopper in the form of an annular trough and provided with an annular discharge outlet, a separating disk revolvably mounted below said hopper, said disk being provided with a central discharge opening, the central discharge opening tapering downwardly and being provided with ribs inclining in the direction of the rotation of the disk to insure the directing of the contents of the disk into the central discharge opening, and means for directing a radial blast against the contents of the hopper as it drops upon the disk.

In testimony whereof I hereunto affix my signature.

FANNIE S. SPITZ.